US007853496B2

(12) United States Patent
Poffenberger et al.

(10) Patent No.: US 7,853,496 B2
(45) Date of Patent: Dec. 14, 2010

(54) PRIORITIZING PRODUCT DEVELOPMENT LINES

(75) Inventors: Michael L. Poffenberger, Atlanta, GA (US); Scott C. Hightower, Atlanta, GA (US); Ray H. Starbird, Avondale Estates, GA (US)

(73) Assignee: Cox Communication, Inc., Atlanta, GA (US)

( * ) Notice: Subject to any disclaimer, the term of this patent is extended or adjusted under 35 U.S.C. 154(b) by 1189 days.

(21) Appl. No.: 11/283,089

(22) Filed: Nov. 18, 2005

(65) Prior Publication Data

US 2006/0116950 A1 Jun. 1, 2006

Related U.S. Application Data (60) Provisional application No. 60/629,740, filed on Nov. 19, 2004.

(51) Int. Cl.
G06Q 40/00 (2006.01)
(52) U.S. Cl. .......................... 705/34; 705/35; 705/36 R; 705/10; 705/14.11; 705/14.18
(58) Field of Classification Search ................... 705/35, 705/36 R, 37, 10, 14.11, 14.18
See application file for complete search history.

(56) References Cited

U.S. PATENT DOCUMENTS

| 4,588,192 | A  | * | 5/1986  | Laborde ..................... 273/240 |
| 5,126,936 | A  | * | 6/1992  | Champion et al. ........ 705/36 R |
| 5,297,031 | A  | * | 3/1994  | Gutterman et al. ............ 705/37 |
| 6,336,103 | B1 | * | 1/2002  | Baker ....................... 705/36 R |
| 6,390,472 | B1 | * | 5/2002  | Vinarsky .................... 273/278 |
| 6,611,735 | B1 | * | 8/2003  | Henly et al. ................ 700/266 |
| 7,124,101 | B1 | * | 10/2006 | Mikurak ..................... 705/35 |
| 7,315,826 | B1 | * | 1/2008  | Guheen et al. ................. 705/7 |
| 2002/0016206 | A1 | * | 2/2002 | Yoshimi et al. .............. 463/42 |
| 2003/0004862 | A1 | * | 1/2003 | Lutnick et al. ................ 705/37 |
| 2003/0154153 | A1 | * | 8/2003 | Steidlmayer et al. ......... 705/37 |
| 2003/0208389 | A1 | * | 11/2003 | Kurihara et al. ............... 705/7 |
| 2003/0225652 | A1 | * | 12/2003 | Minow et al. ................ 705/36 |
| 2005/0022168 | A1 | * | 1/2005 | Zhu et al. ................... 717/124 |
| 2006/0085321 | A1 | * | 4/2006 | Staib et al. ................... 705/37 |

OTHER PUBLICATIONS

Clayton M Christensen, Christopher S Musso, & Scott D Anthony. (2004). Maximizing the Returns From Research. Research Technology Management, 47(4), 12-18. Retrieved Jul. 15, 2010, from ABI/INFORM Global. (Document ID: 661831521).*

(Continued)

*Primary Examiner*—Alexander Kalinowski
*Assistant Examiner*—Muriel Tinkler
(74) *Attorney, Agent, or Firm*—Merchant & Gould P.C.

(57) ABSTRACT

Systems and methods are disclosed for maintaining building serviceability information for geographic locations. The disclosed systems and methods may include forming a future market in which the product developments lines are equated to stocks. Furthermore, the disclosed systems and methods may include determining participants in a trading session of the future market and setting rules governing how the trading session in the future market will operate. Moreover, the disclosed systems and methods may include opening the trading session for the participants, closing the trading session for trading and evaluating market session trends and participant purchases to determine the priority of a product line in relation to other product lines.

15 Claims, 4 Drawing Sheets

OTHER PUBLICATIONS

Richard E Albright, & Thomas A Kappel. (2003). Technology roadmapping: Roadmapping the corporation. Research Technology Management, 46(2), 31-40. Retrieved Jul. 15, 2010, from ABI/INFORM Global. (Document ID: 305041281).*

Banerjee, Sumitro (2004). Strategies for generations of new products: Timing of introduction and sequential R&D. Ph.D. dissertation, Institut Europeen d'Administration des Affaires (France), France. Retrieved Jul. 15, 2010, from ABI/INFORM Global.(Publication No. AAT 3146457).*

* cited by examiner

Michael Poffenberger's Movies Portfolio

NET WORTH today's change: H$(77,697.00) — H$2,723,894.01

| CASH | INTEREST | INVESTMENTS |
|---|---|---|
| H$26,874.78 | H$0.92/day @ +1.25% | H$2,697,019.23 |

RANK
- Overall Rank: 234572
- Change in Rank: down 7579
- Percentile: +60.64%
- How do I rank?
- Graph Net Worth: 30,60,90

% GAIN
- Week-to-Date: +2.72%
- Month-to-Date: +36.19%
- Season-to-Date: +36.19%
- Year-to-Date: +36.19%
- Lifetime-to-Date: +36.19%

Jump to your STARBONDS - FUNDS - OPTIONS

MovieStocks™   Release Date Phase   COMPLETE LIST ▶

| | | | | | | | |
|---|---|---|---|---|---|---|---|
| 6 MovieStocks | 51339 shares | | H$2,545,219.23 | | H$548,239.80 | | +27% |
| symbol | shares | avg paid | curr price | change | total value | net gain/loss | % quicktrader |
| AUST4 | 1000 | H$46.75 | H$60.21 | -0.50 | H$60,210.00 | H$13,460.00 | +28% Trade |
| BORN2 | 1000 | H$94.70 | H$133.79 | -8.93 | H$133,790.00 | H$39,090.00 | +41% Trade |
| BORN3 | 22339 | H$52.01 | H$74.57 | -3.00 | H$1,665,819.23 | H$504,039.80 | +43% Trade |
| BWTCH | 1000 | H$72.63 | H$73.13 | -0.50 | H$73,130.00 | H$500.00 | 0% Trade |
| GRDST | 1000 | H$13.12 | H$10.52 | -0.26 | H$10,520.00 | H$(2,600.00) | -19% Trade |
| YUGIO | 25000 | H$24.32 | H$24.07 | -0.25 | H$601,750.00 | H$(6,250.00) | -1% Trade |

Jump to your MOVIESTOCKS - FUNDS - OPTIONS

StarBonds™   COMPLETE LIST ▶

| 0 StarBonds | 0 shares | H$0.00 | H$0.00 | 0% |
|---|---|---|---|---| funds   COMPLETE LIST ▶

| | | | | | | | |
|---|---|---|---|---|---|---|---|
| 1 Funds | 5000 shares | | H$151,800.00 | | H$8,000.00 | | +6% |
| symbol | shares | avg paid | curr price | change | total value | net gain/loss | % quicktrader |
| MIRMX | 5000 | H$28.76 | H$30.36 | -0.18 | H$151,800.00 | H$8,000.00 | +5% Trade |

Jump to your MOVIESTOCKS - STARBONDS - FUNDS options   COMPLETE LIST ▶

| 0 Options | 0 shares | H$0.00 | H$0.00 | 0% |
|---|---|---|---|---|

PRIORITIZING PRODUCT DEVELOPMENT LINES

RELATED APPLICATION

Under provisions of 35 U.S.C. §119(e), the Applicants claim the benefit of U.S. provisional application No. 60/629,740, filed Nov. 19, 2004, which is incorporated herein by reference.

BACKGROUND

I. Field of the Invention

The present invention generally relates to methods and systems for prioritizing product development lines. More particularly, the present invention relates to prioritizing product development lines or that, for example, using a market based system.

II. Background Information

Prioritizing product development lines is a process for prioritizing product development and company resources for a company. In some situations, acquiring feedback from employees regarding which products should enter a product design phase is difficult and inefficient. For example, engineers that have close relations with customers may not have an opportunity to voice customer concerns or desires because they are not a manager or supervisor. Thus, the conventional strategy for prioritizing such products is to have meetings between company managers and supervisors to determine which products are transitioned into the design phase. This often causes problems because the conventional strategy is costly and inefficient. For example, managers and supervisors are located throughout the country and often reside in other countries. Travel arrangements and organization for such a meeting is time consuming and costly.

In view of the foregoing, there is a need for methods and systems for prioritizing product development lines more optimally. Furthermore, there is a need for prioritizing product development lines in an environment that promotes anonymity thereby allowing all employees to have a voice in prioritizing product development lines.

SUMMARY

Consistent with embodiments of the present invention, systems and methods are disclosed for maintaining building serviceability information for geographic locations.

In accordance with one embodiment, a method of prioritizing product development lines within an organization, comprising forming a future market in which the product development lines are equated to stocks, determining who is allowed to participate in a trading session of the future market, setting rules governing how the trading session in the future market will operate, opening the trading session for trading to those participants allowed to participate in the trading session, closing the trading session for trading, and evaluating market session trends and participant purchases to determine the priority of a product line in relation to other product lines.

According to another embodiment, computer-readable medium which stores a set of instructions which when executed performs a method for prioritizing product development lines within an organization, the method executed by the set of instructions comprising forming a future market in which the product development lines are equated to stocks, determining who is allowed to participate in a trading session of the future market, setting rules governing how the trading session in the future market will operate, opening the trading session for trading to those participants allowed to participate in the trading session, closing the trading session for trading, and evaluating market session trends and participant purchases to determine the priority of a product line in relation to other product lines.

In accordance with yet another embodiment, a system for prioritizing product development lines within an organization, comprising means for forming a future market in which the product developments lines are equated to stocks, means for determining who is allowed to participate in a trading session of the future market, means for setting rules governing how the trading session in the future market will operate, means for opening the trading session for trading to those participants allowed to participate in the trading session, means for closing the trading session for trading and means for evaluating market session trends and participant purchases to determine the priority of a product line in relation to other product lines.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 3 is a diagram illustrating an exemplary graphical user interface used in the system architecture of FIG. 2, according to one embodiment.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Figure 1:
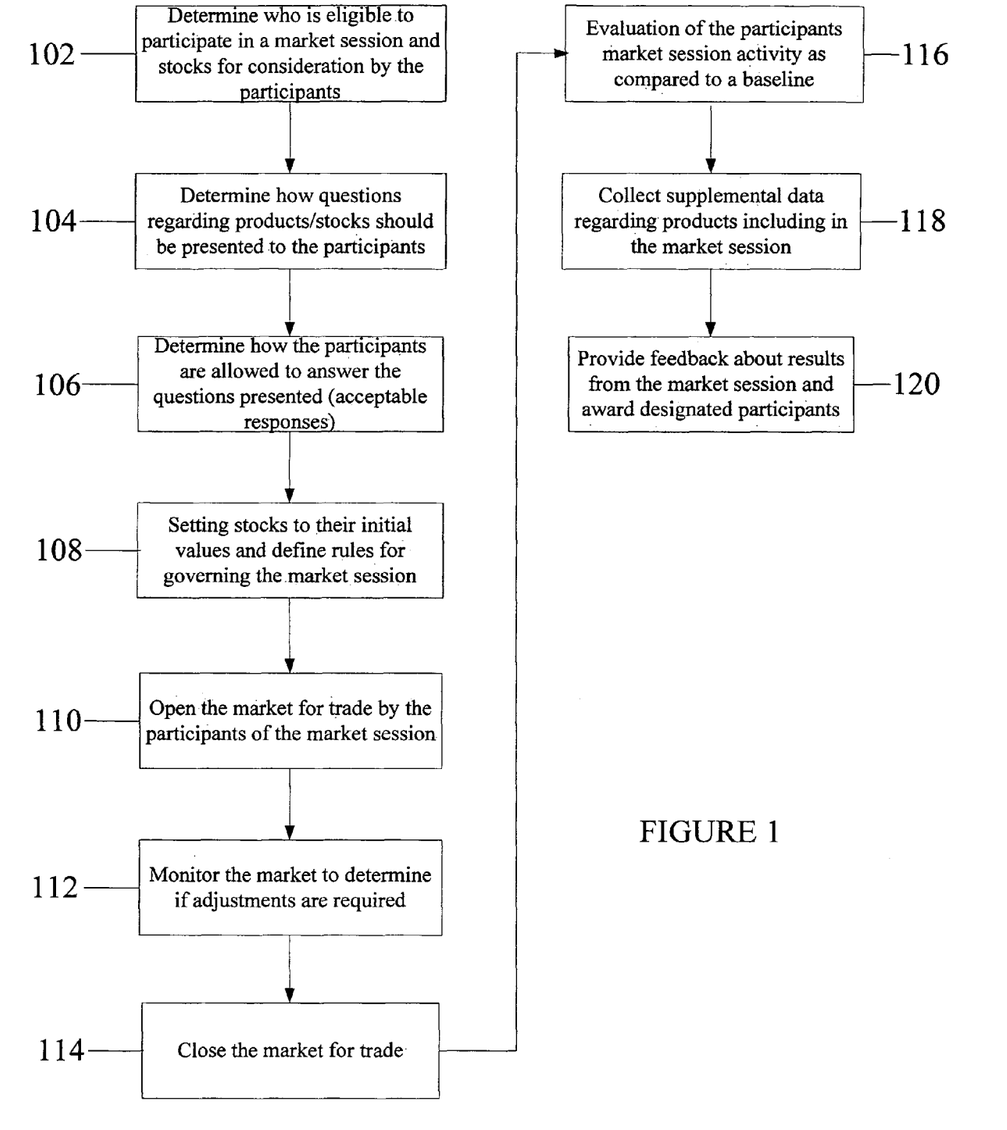
FIG. 1 is a flowchart illustrating an exemplary method for prioritizing product lines using a future market, according to one embodiment.

FIG. 1 illustrates an exemplary method 100 for prioritizing product lines using a future market, according to one embodiment. Method 100 begins at step 102 where market administrators may determine which employees are allowed to participate in market transactions. For example, depending on what type of information is desired, markets participants may be limited to a certain segment of a company, for example, field engineers if information is desired regarding client sentiment with regard to what products are deemed important by the client. In addition, at step 102, the market administrators may determine which stocks that are associated with a particular product line should be included in the market.

At step 104, the market administrators may determine how questions should be presented to market participants. Depending on what type of information is desired at the end of a market session may determine how a question may be presented to a market participant. For example, a question may be presented in a manner in which there are only two outcomes (Yes/No), or in a manner where a participant has to predict a value for a given stock or in a manner where there are multiple outcomes. At step 106, the markets administrators may determine acceptable answers in response to the questions assembled in step 104. Thus, for a questions having only two outcomes, acceptable answers may be for example, YES or NO.

Next at step 108, the market administrators may define rules that govern the operation of the market. For example, a rule may be set requiring a participant to be involved with at least 15 market transactions during a market session in order to be eligible for a reward. Another rule may be a stock floor whereby certain stocks are replaced by other stocks if the stock falls below a certain value. In addition, at step 108, values for stocks are set to their initial values, for example, $0.50 for stocks trading between $0.00 and $1.00.

Next at step 110, once all administrative formalities have been addressed, the market administrators may open the market for trade by the participants. For example, in a market having a binary outcome ($ 0.00 if an associated product does not transition to the design phase or $1.00 if an associated product transitions into the design phase), participants may drive pricing up or down for a certain stock based on an expectation that the associated product line with transition into the design phase. Trading may keep going until a decision is made about the design worthiness of a product or the trading session is terminated. Thus, the stock's price may measure the collective expectation that the product will transition into the design phase or fail to transition into the design phase. The more and the sooner participants expect that a product will enter the design phase, the closer participants will drive the associated stock to $1.00. The more and the sooner people expect that a product will not transition into the design phase, the closer participants will drive the associated stock to $0.00. If the participants have no definitive firm opinion for a given product, the stock price for the associated product should hover around $0.50.

At step 112, the market administrators monitor the market to determine if adjustments are required. For example, the removal of a stock if it falls below the stock floor. After a period of time designated by the market administrators, at step 114, the market is closed preventing participants from conducting further market transactions. At step 116, the participants' stock portfolios are compared with each other as well as a baseline list, established by the organization, of how products should be prioritized based on their probability of transitioning into the design phase.

At step 118, supplemental data about the market session may be assembled and stored in a database for review by the market administrators and company management. For example, data may be assembled regarding participants sales trends to determine which products the participants considered important to the company. Lastly, at step 120, the market administrators present the results of the market session to the participants and company management. Data from the market session can be provided in a variety of formats, for example, the market session data can be displayed in a normalized format to account for stocks that yielded anomalous data. The results can indicate a course of action for an organization to pursue as far as allocating resources and manpower to certain products for conversion into the design phase and indicate which potential areas are ripe for product development. In addition, awards and incentives can be issued to those participants who were closest to the final results and participated during the market session above the minimum requirements.

Figure 2:
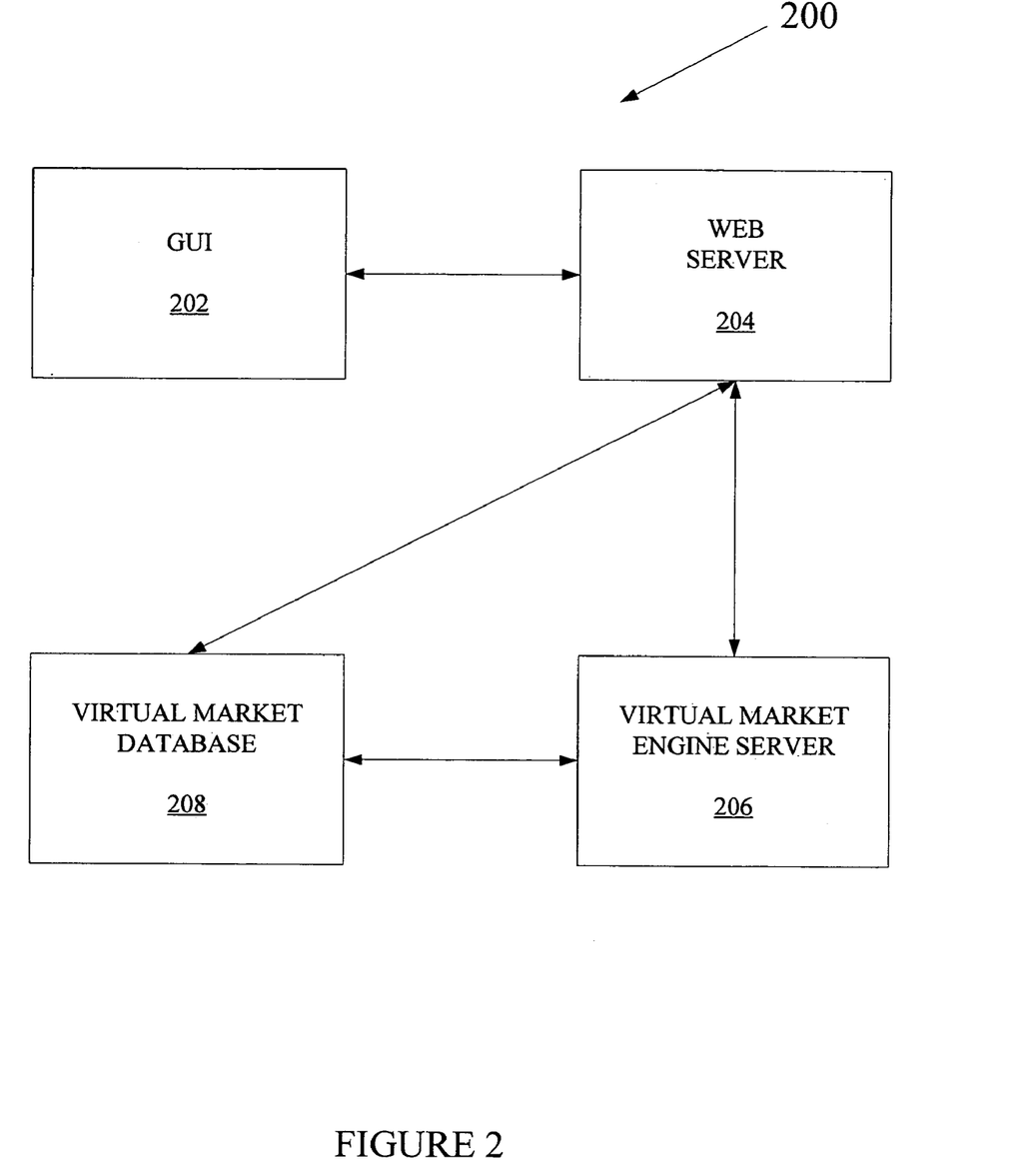
FIG. 2 is a diagram illustrating an exemplary system architecture for implementing the method of FIG. 1, according to one embodiment.

FIG. 2 is a diagram illustrating an exemplary system architecture 200 for implementing the method of FIG. 1, according to one embodiment. The system architecture 200 includes a graphical user interface (GUI) 202, a web server 204, a virtual market engine server 206, and a virtual market database 208. GUI 202 allows participants to interact with system 200 during market sessions, for example, purchasing or selling stocks. Web server 204 accepts information provided by the participants from the GUI 202 and processes the information. Depending on the information received, the web server will forward the information to the virtual market engine server 206, the virtual market database 208, or both.

The virtual market engine server 206 can provide information to the web server 204 for display to a participant using the GUI 202, and provide information for storage in the virtual market database 208. The virtual market engine server 206 processes computational data regarding stock purchases and sales by participants and applies any rules for governing the market. The virtual market engine server 206 also associates transaction information with each participant and allows market administrators to provide market adjustments.

The virtual market database 208 can provide information to the web server 204 for display to a participant using the GUI 202 and to the virtual market engine server 206. The virtual market database 208 stores various data that may be required to operate a market session. The virtual market database 208 stores information regards participants allowed to participate in a market session. The virtual market database 208 also stores a list of stocks that will be traded for a particular market session and their initial trading value. The virtual market database 208 stores questions about the stocks which are presented to the participants and their acceptable responses. In addition, the virtual market database 208 stores rules for governing a market session and a baseline listing of how stocks should be ranked at the end of the market session.

FIG. 3 is a diagram illustrating an exemplary graphical user interface (GUI) 202 used in the system architecture of FIG. 2, according to one embodiment. The GUI 202 can include information necessary for a participant to participate in a market session. For example, the participant can be provided with a link that provides supplemental product information thereby allowing the participant to make a more informed decision for a given stock sale or purchase. In addition, the GUI 202 provides information regarding net worth, changes to stocks due to market fluctuation, participant rank and the participants stock portfolio among other things.

Figure 4:
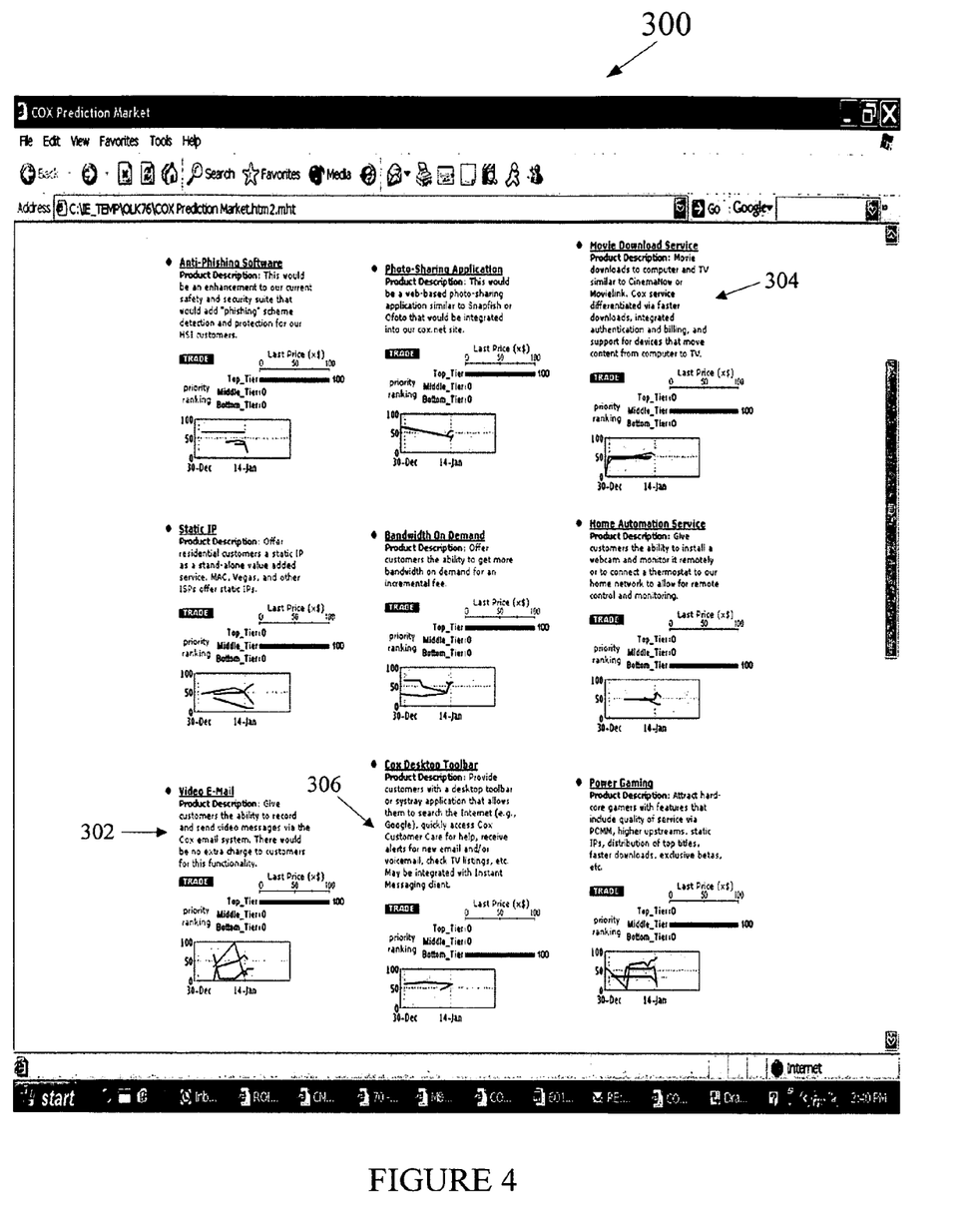
FIG. 4 is a diagram illustrating an exemplary output by the system architecture of FIG. 2, according to one embodiment.

FIG. 4 is a diagram illustrating an exemplary output 300 by the system architecture 200 of FIG. 2. The output 300 may list each stock separately. If the capacity of the organization allows for resources and manpower to be spread over several product lines, the stocks may be categorized and grouped using a tier system. As illustrated in output 300, stocks can fall into several tiers depending on their performance during a market session. If a stock has popularity among the participants of the market session that the stock will enter the design phase, the stock may be designated as a top-tier stock, for example, video email 302. If the participants have a lukewarm feeling about a certain stock in relation to its probability of entering the design phase, the stock may fall into a middle tier, for example, a movie download service 304. If the participants deicide a stock has a low likelihood of entering the design phase, the stock may be placed in a bottom tier, for example, a desktop toolbar 306. Accordingly, the organization can allocate a majority of their manpower and resources to those product lines that are in the top tier.

By utilizing a market environment to obtain information concerning product lines that are in product development, organizations can obtain useful, intelligent information from a plurality of levels and sectors within the organization. Having a reward system linked with the participation of individuals creates an atmosphere that provides information about product lines that are well thought out because the individuals have an incentive to do well during a market session. Thus, organizations save time and money in deciding how to allocate manpower and resources.

The invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering stages and/or inserting or deleting stages, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method of prioritizing product development lines within an organization, the method comprising:

using the computer to form a future market in which the product development lines are associated with stocks, the product development lines including at least a video e-mail product, a movie download service product, and a desktop toolbar product;

determining participants in a trading session of the future market;

setting rules governing how the trading session in the future market will operate, the rules comprising requiring a participant to be involved with at least a plurality of market transactions to be eligible for a reward and replacing at least one of the stocks with another stock when the at least one of the stocks falls below a certain value, wherein the reward is issued to the participant when the participant is closest to final results of the trading session and when the participant is involved with at least the plurality of market transactions;

opening the trading session for the participants, wherein when the trading session is open, the participants trade the stocks based on a likelihood of a product development line associated with a stock will at least one of transition into and fail to transition into a design phase, wherein a first likelihood indicates a collective expectation of the participants that the product development line will transition into the design phase, driving a price associated with the stock higher than an initial trading value, a second likelihood indicates a lack of a definitive opinion by the participants regarding the transition of the product development line into the design phase, maintaining a price associated with the stock at the initial trading value, and wherein a third likelihood indicates a collective expectation of the participants that the product development line will fail to transition into the design phase, driving a price associated with the stock lower than the initial trading value;

closing the trading session for trading, wherein the future market has a tertiary outcome with respect to a trading price for the stocks at the close of the trading session, the tertiary outcome comprising a zero dollar stock price for the product development line which will fail to transition into the design phase, a fifty cent stock price for the product development line for which there is a lack of a definitive opinion by the participants regarding the transition of the product development line into the design phase, and a one dollar stock price for the product development line which will transition into the design phase;

processing, on the computer, computational data regarding the stock trades made by the participants during the trading session, the computational data comprising at least stock purchase prices and stock sale prices during the trading session;

evaluating trading session trends and participant purchases, based on the computational data, to determine the priority of a product development line in relation to other product development lines, wherein the priority is determined from a tier system based on performance of the stocks during the trading session, wherein the tier system comprises a top tier, a middle tier, and a bottom tier, wherein the stocks in the top tier have the one dollar stock price, indicating that the stocks are popular among the participants in the trading system, and wherein the stocks the stocks in the top tier are associated with product development lines which are allocated a majority of organizational manpower and resources thereby saving the organization time and money in manpower and resource allocation; and displaying, by the computer, a user interface comprising information for the participant to participate in the trading session, the information comprising a net worth of the participant, changes to the stocks due to market fluctuation, a ranking of the participant with respect to other participants, during the trading session, and a stock portfolio of the participant, and wherein the user interface provides a link that provides supplemental product information for the participant to make an informed decision for a given stock sale or purchase.

2. The method of claim 1 further comprising determining how questions concerning certain stocks are presented to the participants.

3. The method of claim 2 further comprising determining acceptable answers to the questions presented to the participants.

4. The method of claim 1 further comprising setting the stocks to their initial values prior to opening the trading session.

5. The method of claim 1 further comprising monitoring the trading session and adjusting the trading session due to circumstances occurring during the trading session.

6. The method of claim 1 further comprising collecting supplemental data for the trading session for correlating trading session data and a baseline interpretation of product development importance by the organization.

7. The method of claim 1 further comprising rewarding the participants for their participation in the trading session based on predetermined criteria.

8. The method of claim 1 further comprising reporting trading session data to individuals within the organization.

9. The method of claim 1, wherein the participants are provided with information about the product development lines associated with a given trading session.

10. The method of claim 1, wherein trading session data can be provided to individuals within an organization in a plurality of formats.

11. A computer-readable storage medium which stores a set of instructions which, when executed by a computer, causes the computer to perform a method for prioritizing product development lines within an organization, the method executed by the set of instructions comprising:

using the computer to form a future market in which the product development lines are associated with stocks, the product development lines including at least a video e-mail product, a movie download service product, and a desktop toolbar product;

determining participants in a trading session of the future market;

setting rules governing how the trading session in the future market will operate, the rules comprising requiring a participant to be involved with at least a plurality of market transactions to be eligible for a reward and replacing at least one of the stocks with another stock when the at least one of the stocks falls below a certain value, wherein the reward is issued to the participant when the participant is closest to final results of the trading session and when the participant is involved with at least the plurality of market transactions;

opening the trading session for the participants, wherein when a market session is open, the participants trade the stocks based on a likelihood of a product development line associated with a stock will at least one of transition into and fail to transition into a design phase, wherein a first likelihood indicates a collective expectation of the participants that the product development line will transition into the design phase, driving a price associated with the stock higher than an initial trading value, a second likelihood indicates a lack of a definitive opinion by the participants regarding the transition of the product development line into the design phase, maintaining a price associated with the stock at an initial trading value, and wherein a third likelihood indicates a collective expectation of the participants that the product development line will fail to transition into the design phase, driving a price associated with the stock lower than the initial trading value;

closing the trading session for trading, wherein the future market has a tertiary outcome with respect to a trading price for the stocks at the close of the trading session, the tertiary outcome comprising a zero dollar stock price for the product development line which will fail to transition into the design phase, a fifty cent stock price for the product development line for which there is a lack of a definitive opinion by the participants regarding the transition of the product development line into the design phase, and a one dollar stock price for the product development line which will transition into the design phase;

processing computational data regarding the stock trades made by the participants during the trading session, the computational data comprising at least stock purchase prices and stock sale prices during the trading session;

evaluating trading session trends and participant purchases to determine the priority of a product development line in relation to other product development lines, wherein the priority is determined from a tier system based on performance of the stocks during the trading session, wherein the tier system comprises a top tier, a middle tier, and a bottom tier, wherein the stocks in the top tier have the one dollar stock price, indicating that the stocks are popular among the participants in the trading system, and wherein the stocks the stocks in the top tier are associated with product development lines which are allocated a majority of organizational manpower and resources thereby saving the organization time and money in manpower and resource allocation; and displaying a user interface comprising information for the participant to participate in the trading session, the information comprising a net worth of the participant, changes to the stocks due to market fluctuation, a ranking of the participant, with respect to other participants, during the trading session, and a stock portfolio of the participant, and wherein the user interface provides a link that provides supplemental product information for the participant to make an informed decision for a given stock sale or purchase.

12. The computer readable storage medium of claim 11 further comprising monitoring the trading session and adjusting the trading session due to circumstances occurring during the trading session.

13. The computer readable storage medium of claim 11 further comprising collecting supplemental data for the trading session for correlating trading session data and a baseline interpretation of product development importance by the organization.

14. An apparatus for prioritizing product development lines within an organization, comprising:
a computer, wherein the computer is used in:
forming a future market in which the product development lines are associated with stocks, the product development lines including at least a video e-mail product, a movie download service product, and a desktop toolbar product;
determining participants in a trading session of the future market;
setting rules governing how the trading session in the future market will operate, the rules comprising requiring a participant to be involved with a minimum number of a plurality of market transactions to be eligible for a reward and replacing at least one of the stocks with another stock when the at least one of the stocks falls below a certain value, wherein the reward is issued to the participant when the participant is closest to final results of the trading session and when the participant is involved with at least the minimum number of the plurality of market transactions, wherein the minimum number of a plurality of market transactions to be eligible for a reward comprises at least fifteen transactions;
opening the trading session for the participants, wherein when the trading session is open, the participants trade the stocks based on a likelihood of a product development line associated with a stock will at least one of transition into and fail to transition into a design phase, wherein a first likelihood indicates a collective expectation of the participants that the product development line will transition into the design phase, driving a price associated with the stock higher than an initial trading value, a second likelihood indicates a lack of a definitive opinion by the participants regarding the transition of the product development line into the design phase, maintaining a price associated with the stock at an initial trading value, and wherein a third likelihood indicates a collective expectation of the participants that the product development line will fail to transition into the design phase, driving a price associated with the stock lower than the initial trading value;
closing the trading session for trading, wherein the future market has a tertiary outcome with respect to a trading price for the stocks at the close of the trading session, the tertiary outcome comprising a zero dollar stock price for the product development line which will fail to transition into the design phase, a fifty cent stock price for the product development line for which there is a lack of a definitive opinion by the participants regarding the transition of the product development line into the design phase, and a one dollar stock price for the product development line which will transition into the design phase;
evaluating trading session trends and participant purchases to determine the priority of a product development line in relation to other product development lines, wherein the priority is determined from a tier system based on performance of the stocks during the trading session, wherein the tier system comprises a top tier, a middle tier, and a bottom tier, wherein the stocks in the top tier have the one dollar stock price, indicating that the stocks are popular among the participants in the trading system, and wherein the stocks the stocks in the top tier are associated with product development lines which are allocated a majority of organizational manpower and resources thereby saving the organization time and money in manpower and resource allocation; and
displaying a user interface comprising information for the participant to participate in the trading session, the information comprising a net worth of the participant, changes to the stocks due to market fluctuation, a ranking of the participant during the trading session, and a stock portfolio of the participant, and wherein the user interface provides a link that provides supplemental product information for the participant to make an informed decision for a given stock sale or purchase.

15. The apparatus of claim 14, wherein the product development lines associated with the top tier, the middle tier, and the bottom tier comprise the video e-mail product, the movie download service product, and the desktop toolbar product.

* * * * *